United States Patent [19]

Heisel et al.

[11] Patent Number: 4,636,377

[45] Date of Patent: Jan. 13, 1987

[54] INTEGRATED SCRUBBING OF $SO_2$ AND PRODUCTION OF SULFUR

[75] Inventors: Michael Heisel, Pullach; Freimut Marold, Neubiberg; Gerhard Linde, Gruenwald, all of Fed. Rep. of Germany

[73] Assignee: Linde Aktiengesellschaft, Wiesbaden, Fed. Rep. of Germany

[21] Appl. No.: 762,072

[22] Filed: Aug. 2, 1985

[30] Foreign Application Priority Data

Aug. 2, 1984 [DE] Fed. Rep. of Germany ....... 3428548

[51] Int. Cl.$^4$ ............................................. C01B 17/02
[52] U.S. Cl. ............................... 423/575; 423/573 R; 423/574 L
[58] Field of Search .................... 423/573 R, 567, 575, 423/573 G, 574 R, 574 L

[56] References Cited

U.S. PATENT DOCUMENTS 3,598,529  8/1971  Deschamps et al. ................ 423/575
4,155,988  5/1979  Karwat et al. ....................... 423/575

Primary Examiner—Gregory A. Heller
Attorney, Agent, or Firm—Millen & White

[57] ABSTRACT

For producing elemental sulfur, $SO_2$ is dissolved in a regenerable solvent, which is treated with a reducing agent, and the thus-formed sulfur is separated from the solution.

24 Claims, 1 Drawing Figure

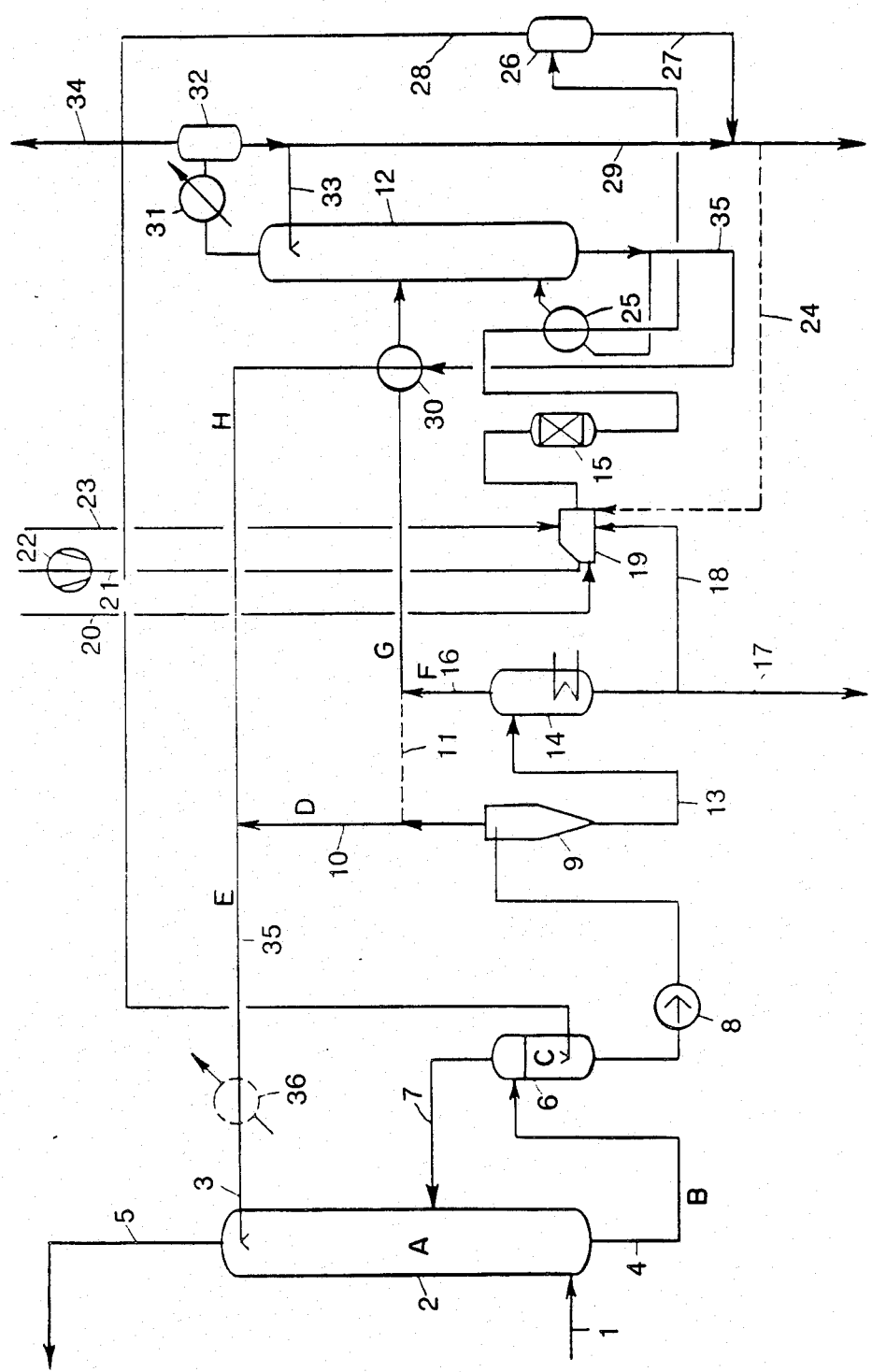

INTEGRATED SCRUBBING OF $SO_2$ AND PRODUCTION OF SULFUR

BACKGROUND OF THE INVENTION

This invention relates to a process for the production of elemental sulfur from $SO_2$.

A number of processes are available for converting $SO_2$ into elemental sulfur. Most are based on two fundamental methods: the reduction of $SO_2$ over incandescent coke, or the reduction of gaseous $SO_2$ by reducing gases in the presence of a catalyst. Reference is invited, for example, to BEAVON TGT or SCOT, wherein BEAVON describes the hydrogenation of all S-compounds, with a subsequent Stretford wash of $H_2S$, and SCOT describes the hydrogenation of all S-compounds, with a subsquent Amin wash of $H_2S$ (Hydrocarbon Processing April 1973 p. 87 ff).

Such conventional processes, however, exhibit one or more disadvantages when utilized for the desulfuration of flue gas. During reduction over incandescent coke, many by-products are formed, e.g., COS and $CS_2$, which must be decomposed in a combustion chamber, and the resultant combustion gas must be recycled to upstream of the flue gas desulfuration. In case of reduction by the addition of a reducing gas (e.g., Hydrocarbon Processing, April 1984, P. 83), a Claus plant of relatively simple design is required to react the $H_2S$ produced by reduction with $SO_2$ in order to produce sulfur; however, the investment cost for even such a simple Claus plant is considerable.

SUMMARY OF INVENTION

An object of one aspect of the invention is to provide an improved process for producing sulfur from $SO_2$.

Upon further study of the specification and appended claims, further aspects and modifications of this invention will become apparent to those skilled in the art.

Embracing the broadest aspect of the invention, there is provided a process comprising: dissolving $SO_2$ in a regenerable solvent, contacting the solution with a reducing agent, and separating the resultant sulfur from the solution.

According to the invention, therefore, a reduction of $SO_2$ in the liquid phase is performed. In this connection, the cost of apparatus in this liquid-phase reaction of sulfur from $SO_2$ is substantially lower than the cost required for a gas-phase reaction.

Physical solvents are especially suitable as the solvent, especially such solvents useful as scrubbing agents for flue gas or Claus tail gas desulfuration. Such solvents are normally thermally regenerated in order to desorb $SO_2$ from the solvent which is then recycled to the scrubber. In the present invention, the loaded solvent, in contrast, is combined with a reducing agent to convert $SO_2$ to elemental sulfur. Optionally, a catalyst can be added to increase the reaction rate and obtain a more complete reaction. Likewise, by the addition of settling aids, the rate of sulfur settling can be increased. In any case, chemical regeneration of the solvent takes place due to the reaction, resulting in the possibility of omitting the conventional thermal regeneration of the entire solvent in order to desorb $SO_2$. This results in considerable savings in the cost of heat exchangers and the regenerating column. The energy requirement for thermal regeneration of the solvent is also substantially reduced.

Owing to the elimination of the need for regenerating the entire solvent (only a partial stream, e.g., 1 to 50%, preferably 5 to 20% of the total, is regenerated for water separation), as well as of the $SO_2$ purification and $SO_2$ liquefaction that is needed in some cases, the consumption of chemicals for the proposed process is likewise more favorable than other processes.

Marketable sulfur, as manufactured by this invention, can be stockpiled, transported, and sold without problems and without endangering the environment. In contrast thereto, the storage, transportation, and marketing of $SO_2$ are difficult. Another advantage of this invention is the space saved by a reduction in size of the total installation.

Solvents that can be used in this invention are all physical absorbents, especially those exhibiting selectivity for $SO_2$ as compared, for example, with $CO_2$ or, if present, light hydrocarbons. Preferred examples of these solvents include but are not limited to alcohols, such as, e.g., methanol, ketones, N-methylpyrrolidone, dimethylformamide, polyethylene glycol ether, butyrolactone, aromatic compounds, e.g., benzene.

It is particularly advantageous to maintain certain levels of sulfur saturation in the solvent. During the reduction step, on a steady state continuous basis, the sulfur concentration in the solvent is approximately at the saturation point or even above saturation. Conversely, during the period after the sulfur separation and during the course of the regeneration of a minor amount of solvent to remove water up to recontacting the solvent with the reducing agent, the sulfur concentration in the solvent is adjusted so that it is well below the saturation point.

The reason for such undersaturation is that the solvent leaving the solid-liquid separation is in thermodynamic equilibrium with solid sulfur, i.e. cooling can lead to further precipitation of sulfur crystals, and only by undersaturation is it possible to prevent impairment of pipelines, fittings, or apparatuses by sulfur deposits. Thus, the sulfur-saturated partial stream from the solid-liquid separation is mixed with sulfur-undersaturated scrubbing medium from the regeneration step used to remove water. The percent of saturation in the solvent to the scrubber is in the range of 70 to 99%, preferably 80 to 95%, which determines the amount of undersaturated medium to be mixed to.

The solubility of elemental sulphur is mainly affected by temperature, i.e. at lower temperatures solubility decreases, so that sulphur is precipitated.

This means that cooling is preferably provided in one or more zones: within the column; in the zone between the column and the reactor; or in the region between the reaction vessel and the solid-liquid separation. By such cooling, the temperature of the sulfur-solvent suspension can be lowered so that sulfur is precipitated in the solid form. This procedure also permits the temperature of the solvent reflux to be maintained at a lower level, which in turn increases the absorption capacity of the solvent for $SO_2$. To reduce solvent losses, direct or indirect head cooling is preferably provided at the scrubbing column in certain cases; preferably a direct water quench will both cool the solvent and prevent entrainment thereof into the exit gas.

Cooling is preferably effected so as to cool the incoming fluid by a decrement of about 5° to 50° C., preferably 10 to 20 degrees C. in the region between the column bottom of the scrubber and the solid-liquid separation.

It is also preferred for the solution to be maintained at a temperature of between −40° C. and +200° C., preferably between 15° C. and 60° C. during absorption, the particular temperature depending on the solvent employed. In the optionally installed melting step a temperature above the sulfur melting point, preferably about 120° C., is maintained. In the regeneration the solvent may be regenerated either by heating and/or by stripping. Heat regeneration takes place at a temperature of 60°-180°, preferably 80°-120° C.

Suitably, the reducing agent is added in the ratio that is approximately stoichiometric with respect to the conversion of the $SO_2$ into elemental sulfur. Deviations from stoichiometry lead to incomplete conversion which, though less efficient, may be desirable for reasons of operating safety.

Suitable reducing agents for the process of this invention are all materials known for this purpose. Especially advantageous proved to be $H_2$ and $H_2S$. The reaction takes place in accordance with the following equations, depending upon the reducing gas employed:

$$SO_2 + 2H_2 \rightarrow 1/xS_x + 2H_2O \qquad (1)$$

$$SO_2 + 2H_2S \rightarrow 3/xS_x + 2H_2O \qquad (2)$$

The reducing gases can be added in this process in the gaseous phase or dissolved in the solvent.

According to another aspect of this invention, the reducing gas is produced as follows: preferably, a hydrocarbon-containing fuel, especially natural gas, is burned with a deficiency of oxygen; the thus-obtained gaseous mixture is brought into contact with liquid sulfur, thus reducing part of the sulfur; the reaction mixture is cooled, and the cooled reaction mixture containing the residual sulfur and in some cases sulfur compounds formed in the thermal stage, such as, for example COS and $CS_2$, are hydrogenated to $H_2S$ over a catalyst, and the thus-produced gaseous mixture is employed as the reducing agent.

The catalytic hydrogenation of the sulfur to $H_2S$ is conducted at temperatures of between 150° C. and 560° C., preferably between 180° C. and 350° C. with conventional catalysts, preferably cobalt-molybdenum catalyst. The resultant gaseous mixture is obtained at a high temperature and is preferably cooled in indirect heat exchange before being introduced into the solution.

In many solvents, the sulfur is obtained in colloidal form. Therefore, a conventional settling aid is added to the solvent, e.g., ammoniumrhodanid, that enhances sedimentation of the thus-formed sulfur and/or accelerates the reaction rate of the reaction. In this case, the objective is attained by increasing the particle size of the thus-produced sulfur, therefore increasing the sedimentation velocity of the resultant sulfur particles. The additive is advantageously added in an amount 1-20 g/l of solvent, preferably 1-10 g/l of solvent.

The thus-produced sulfur is thereafter separated from the liquid phase advantageously by means of a solid-liquid separating method such as, for example, with a centrifuge, a hydrocyclone, or a vibrating sieve. In this process, a concentrated mixture of solid sulfur and liquid phase is discharged. This mixture is preferably heated to such an extent that two liquid phases are formed and sulfur can be withdrawn as one liquid phase and sulfur-free solvent can be discharged as the other liquid phase. Heating of the mixture is effected suitably to a temperature approximately of the melting point of sulfur, i.e. about 120° C. In particular, the heating step can be performed with waste heat obtained from the combustion of the hydrocarbon-containing fuels.

Optionally, the process can be carried out without optimum solvent recovery, and the sulfur can be obtained directly as a product from the solid-liquid separating stage.

There are, of course, still other possibilities for providing reducing gas for sulfur manufacture, namely, for example, $H_2$ from steam reformers, $H_2$ or $H_2S$ from bottles; $H_2$ from ammonia dissociation; a portion of $H_2S$-containing gas from a Claus plant; $H_2S$ production from $SO_2$ instead of from elemental sulfur, wherein $SO_2$ is obtained, for example, from flue gas desulfuration, as described for example in Linde Reports on Science and Technic 1985, No. 40, pp 3-13.

The attached FIGURE is a schematic illustration of a preferred comprehensive embodiment of this invention.

DETAILED DESCRIPTION OF DRAWING

Via conduit 1, 100,100 $Nm^3/h$ of an $SO_2$-containing crude gas is introduced, under a pressure of about 1.1 bar and at a temperature of 61.3° C., into a scrubbing columm 2. The crude gas has the following composition:

| | |
|---|---|
| $N_2$ | 78.06 mol % |
| $O_2$ | 4.97 mol % |
| $CO_2$ | 9.87 mol % |
| $SO_2$ | 0.08 mol % |
| $H_2O$ | 6.97 mol % |
| HCl | 0.01 mol % |
| HF | 23 ppm |
| $NO_x$ | 0.04 mol % |
| $SO_3$ | 30 ppm |

Water scrubbing, not shown, is optionally conducted in the lower section of the column in order to remove solids and water-soluble compounds from the gas. Furthermore, a portion of the introduced water vapor is condensed and removed so as to lower the vapor capacity requirements of the downstream equipment. In the head of the scrubbing column, regenerated solvent is supplied via conduit 3. The solvent, for example polyethylene glycol dimethyl ether, countercurrently absorbs $SO_2$ from the ascending gas, and the resultant loaded solvent bottom is withdrawn via conduit 4. An overhead $SO_2$-depleted gas, 95,262 $Nm^3/h$, is withdrawn via conduit 5 at a temperature of 16.5° C. and under a pressure of 0.97 bar. This gas has the following composition:

| | |
|---|---|
| $N_2$ | 82.36 mol % |
| $O_2$ | 5.21 mol % |
| $CO_2$ | 10.46 mol % |
| $SO_2$ | 95 ppm |
| $H_2O$ | 1.92 mol % |
| $NO_x$ | 430 ppm |

To prevent entrainment of solvent in the exit gas, a conventional scrub, not shown, can be used in the head of the scrub column 2.

In a reactor 6, $H_2S$ is added via conduit 28 to the $SO_2$-loaded solvent entering the reactor via conduit 4, which $H_2S$ is either in the gaseous phase or dissolved in a solvent. The $SO_2$-loaded solvent entering reactor 6 on a hourly basis comprises about 75 $Nm^3/h$ of $SO_2$ and 32 275 $Nm^3/h$ of solvent. Reducing gas is added near the stoichometric amount 2, i.e. 673 Nm³/h containing about 21.7% H₂S (balance N₂, CO₂, H₂O). Thereby, elemental sulfur is formed by the Claus reaction.

Since the H₂S generally is not available as a pure fraction, a gaseous phase of inert gases is formed above the solvent in vessel 6. These gases can be recycled via conduit 7 into the scrubbing column 2 or—depending on the requirements at the production site—into the combustion chamber of a steam boiler, to be described below. In this case, in total, 551 Nm³/h of inert gases are recycled at a temperature of about 30° C., and under a pressure of about 1 bar, and are of the following composition:

| | | |
|---|---|---|
| N₂ | 75 mol % | |
| CO₂ | 24 mol % | |
| H₂O | 1 mol % | |

After the reaction, the solvent in the reactor 6 contains large sulfur crystals which accumulate on the bottom. This mixture is transferred by way of pump 8 into a conventional solid-liquid separation stage, preferably a hydrocyclone 9. In the latter, a large amount of solvent, low in sulfur, is separated and recycled via conduits 10 and 3 to the scrubbing column 2. A partial stream (about 10%) can optionally be branched off via the conduit 11, shown in dashed lines, to a regenerating column 12.

A concentrated mixture of sulfur crystals and solvent is withdrawn from the bottom of the hydrocyclone via conduit 13 in a quantity of 146 Nm³/h and heated in a tank 14 to about 120° C. to liquefy the sulfur. Heating can optionally be effected by passing steam or exhast gas from the aforementioned steam boiler or preferably from a reactor 15, through a heating coil positioned in heating tank 14. The solvent recovered from tank 14 via conduit 16 may be recycled, after cooling, or preferably at least in part, passed to the regenerating column 12. (Separation of water vapor at the head of the tank 14 via another conduit (not shown) is also possible.)

Liquid sulfur product (73 Nm³/h) is withdrawn from tank 14 via conduit 17 and transferred to storage facilities for liquid or solid sulfur. Preferably, a partial stream of the liquid sulfur is mixed by way of conduit 18 with hot gas in a reducing-gas generator 19. Thereby the sulfur is vaporized, reacts with the reducing gas, and is conducted together with the reducing gas over a catalyst in reactor 15 where a fine hydrogenation (a finishing step) of the residual sulfur and of the sulfur compounds (except for H₂S) is conducted.

The reducing gas or precursors thereof are supplied from an external source. Suitable are all gases containing H₂ and CO, or CO and water. However, it is preferred to provide the reducing gas by burning hydrocarbon-containing fuels, especially natural gas, with stoichiometrically deficient oxygen. For this purpose, 94 Nm³/h of natural gas is supplied via conduit 20 at a temperature of 20° C., under a pressure of 5 bar, and having a composition of N₂ of 4.3 mol-% and CH₄ of 95.7 mol-%. Air (514 Nm³/h) is supplied via conduit 21 provided with compressor 22. A reducing gas mixture is thereby formed of H₂, CO, CO₂, N₂, H₂O and traces of methane. Liquid sulfur is injected into this gas. Upon contact between sulfur and the reducing gas, sulfur compounds are formed spontaneously, particularly H₂S, the temperature rising markedly. This gas is preferably cooled with water from conduit 23 or with condensate from conduit 24 by direct injection and/or by mixing with sulfur-containing crude gas; optionally it is re-contacted with liquid sulfur to absorb sulfur vapor.

The gaseous mixture enters the reactor 15 where sulfur and sulfur compounds are catalytically hydrogenated to H₂S. The CO shift reaction likewise takes place, by virtue of the presence of CO and H₂O contained in the gas:

$$CO + H_2O \rightarrow H_2 + CO_2 \qquad (3)$$

These reactions, and the catalysts to be used for this purpose such as, for example, CoMo catalysts, are conventional and known per se. The reactions occur at about 150° C. to 400° C. Because of the exothermic nature of the reaction, the temperatures at the outlet of the reactor 15, are higher than at the inlet.

The hot gas from reactor 15 can be cooled by water injection. It is preferable, however, to use the hot gas to provide heat to the regenerating column 12 via heat exchanger 25, or by any other heating technique, e.g., the use of any intermediate heat transfer medium. The thus-cooled gas is passed to a phase separator 26 wherein condensed water is separated and discharged via conduit 27. Part of the water can optionally be passed via the conduit 24 shown in dashed lines (and optionally mixed with condensate from conduit 29) to the reaction chamber of the reducing gas generator 19. The overhead gas from phase separator 26, consisting essentially of H₂S, N₂, CO, equivalent to 673 Nm³/h of reducing gas is recycled via conduit 28 to the reaction vessel 6.

Alternatively and optionally, the H₂S can be dissolved in the solvent in a dissolving tank that is not illustrated, and then the H₂S-loaded solvent can be conducted to the vessel 6. The residual gases from the H₂S dissolution step are generally so clean that they can be passed in a conduit (not shown) into the pure gas in conduit 5. In case of very high requirements regarding waste gas purity, these residual gases can also be returned via a conduit (not shown) into the scrubbing column 2.

The solvent from heating tank 14 is at least in part, passed to the regenerating column 12 in order to separate water and any inert gases that may have accumulated in the solvent. Regeneration takes place preferably thermally, but can also be achieved by stripping. For this reason, the solvent is optionally heated in a heat exchanger 30 against hot, regenerated solvent. Then it enters the column which is heated by way of a heat exchanger (reboiler) 25 (heated with hot gas from reactor 15 or another heating medium) and cooled in a head condenser 31 provided with cooling water. Condensed water is separated in a phase separator 32 from inert gases, and introduced via conduit 29 in part as reflux via conduit 33 into the regenerating column 12. Another part of the water can be passed, for example, via conduit 24 to the reducing gas generator 19 to cool the gas downstream of the burner; and, in part, discharged. The inert gases (51 Nm³/h) are discharged at a temperature of 50° C. and under a pressure of 1.0 bar (8 Nm³/h or CO₂ and 50 Nm³/h of H₂O) via conduit 34 to the flue.

The regenerated solvent bottoms are withdrawn from the regenerating column 12 via conduit 35, optionally cooled in heat exchanger 30 and—if desired after further cooling against external refrigeration in a heat exchanger 36—recycled into the scrubbing column 2.

If the regenerated solvent, the amount of which generally is only a fraction (10%) of the total quantity of solvent, is conducted directly to the scrubbing column 2 and fed in below the top section thereof while part of the cold solvent is fed to the top, then the heat exchanger 30 can be omitted in some cases. However, in such an instance, the hot, regenerated solvent must be mixed before entering the scrubbing column with cold solvent coming from 9 (liquid-solid-separation), before it is introduced, in order to avoid sulfur precipitation.

The solubility of sulfur in the solvent is mainly affected by temperature, that means the necessity of lowering temperatures in zones, where the solid sulfur should be separated from the liquid, and rising temperatures in zones, where the solvent is transported through/to equipment. So in general the temperature of the solvent in the solid-liquid-separation is kept 10 to 50 degrees C. lower than in the other parts of the solvent cycle.

For an indication of the extent of saturation and cooling at various parts of the system, the following tables refer to the letters A through H of the FIGURE.

| | State of Saturation |
|---|---|
| A | strongly undersaturated (medium temperature) |
| B | like A |
| C | saturated (liquid + solid sulfur - medium or low temp.) |
| D | like C, however no solid sulfur |
| E | undersaturated due to mixing with regenerated solvent (and higher temperature) |
| F | saturated (high temperature, 120° C.) |
| G | saturated (medium temperature) |
| H | strongly undersaturated (medium temperature) |

| | Cooling Zones |
|---|---|
| A | Cooling at slightly lower temperature (small $\Delta t$), possible to remove heat of reaction (solution $SO_2$ and |
| B | $H_2S + SO_2 = 2$) and $\Delta t$ of heat exchanger 30; strong cooling not possible due to fouling of exchanger surface by sulfur crystals. |
| C | Strong cooling possible (reactor stirred by gas bubbling through keeping heat exchanger surface clean). |
| D | No cooling possible (saturated), |
| E | like A |
| F | cooling not possible (saturated) |
| G | like F |
| H | cooling well possible (strongly undersaturated). |

Whereas the above embodiment is a description of the invention as related to recovery of sulfur from flue gas, the invention is also applicable to sulfur recovery from a wide variety of sources and the following being merely a few non-limiting examples thereof.

Sulfur Recovery from Tail Gas of a Claus Plant

Under a pressure of 1.22 bar, 1,000 mol/sec of a Claus tail gas having the following composition is passed on to the scrubbing stage:

| $N_2$ | 61.7000 mol % |
|---|---|
| $CO_2$ | 5.5057 mol % |
| $H_2S$ | 0.5600 mol % |
| $SO_2$ | 0.2820 mol % |
| COS | 0.0107 mol % |
| $CS_2$ | 0.0013 mol % |
| $S_8$ | 0.1496 mol % |
| $H_2O$ | 31.7907 mol % |

As solvent is used polyethylenglycoldimethylether in an amount of 151 t/h.

The reaction yields 2.32 mol/sec of elemental sulfur ($S_8$).

The residual content of 1.972 mol/sec of $H_2S$, $SO_2$, COS and $CS_2$ is discharged into the $SO_2$-depleted scrubbed gas withdrawn from the scrubber, i.e., the total sulfur recovery amounts to about 99.28%, where the Claus plant for itself has a sulfur recovery of 92.6%.

Of, in total, 8.42 mol/sec of $H_2S+SO_2$, 6.57 mol/sec (corresponding to 78%) is reacted to $S_8$. Additionally, the elemental sulfur already produced previously, i.e., in the Claus plant, is practically entirely recovered in the scrubbing step, since the sulfur vapor pressure at the scrubbing temperature (16.5° C.) is extremely low. The sulfur loss into the $SO_2$-depleted scrubbed gas consists of

| COS | 0.107 mol/sec |
|---|---|
| $CS_2$ | 0.013 mol/sec |
| $H_2S$ | 1.235 mol/sec |
| $SO_2$ | 0.617 mol/sec |

Recovery of Sulfur from $SO_2$ Fraction, Using Crude Claus Gas for the Reaction

The scrubbing stage is supplied with 1,209.534 mol/sec of an $SO_2$-containing gas having the following composition:

| $N_2$ | 64.273 mol % |
|---|---|
| $O_2$ | 0.905 mol % |
| $CO_2$ | 5.446 mol % |
| $H_2S$ | 5 ppm |
| $SO_2$ | 1.697 mol % |
| $H_2O$ | 27.679 mol % |

The inert gases, especially $O_2$, are dissolved in the scrubbing medium, e.g., polyethylenglycoldimethylether, in traces only. For $SO_2$ conversion, some of entering crude gas to the Claus plant (373.44 mol/sec) is branched off and added for $SO_2$ conversion, namely 55.245 mol/sec, having the following composition:

| $N_2$ | 5.5338 mol % |
|---|---|
| $CO_2$ | 11.9504 mol % |
| $CH_4$ | 1.7526 mol % |
| $C_{2+}$ | 0.4106 mol % |
| $H_2S$ | 74.2800 mol % |
| $H_2O$ | 6.0726 mol % | so that 41.036 mol/sec of $H_2S+SO_2$ react to an extent of more than 99.9% to elemental sulfur. The total sulfur recovery is therefore about 99.9%. The pure gas has the following composition:

| $N_2$ | 90.322 mol % |
|---|---|
| $O_2$ | 1.272 mol % |
| $CO_2$ | 7.653 mol % |
| $H_2S$ | <10 ppm |
| $SO_2$ | <5 ppm |
| $COS/CS_2$ | — |
| $H_2O$ | 0.753 mol % |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of elemental sulfur from $SO_2$, comprising the steps of: dissolving the $SO_2$ in a regenerable physical solvent, contacting resultant solution with a reducing agent to convert the $SO_2$ to sulfur, separating the resultant sulfur from the solution, passing a minor portion of said resultant solution from the separating step to a regeneration stage to remove water and sulfur from said minor portion, combining resulting regenerated minor portion with remaining solvent from said separating step, and scrubbing a raw $SO_2$-containing gas with said combined solution thereby dissolving said $SO_2$, wherein the concentration of sulfur is maintained at saturation or above saturation during said reacting step and after said separating step, and the concentration of sulfur in the solvent is maintained at a level close to or below saturation during the scrubbing step and in downstream zones leading to the contacting step.

2. A process according to claim 1, further comprising cooling solutions having an increased sulfur concentration to a lower temperature than solutions having a lower sulfur concentration.

3. A process according to claim 1, said solvent being maintained at a temperature of between $-40°$ C. and $+200°$ C.

4. A process according to claim 1, said solvent being maintained at a temperature of between $15°$ C. and $60°$ C. during absorption.

5. A process according to claim 1, wherein the reducing agent is added in an approximately stoichiometric proportion for the conversion of the $SO_2$ into elemental sulfur.

6. A process according to claim 1, wherein the reducing agent is hydrogen.

7. A process according to claim 1, wherein the reducing agent is hydrogen sulfide.

8. A process according to claim 7, wherein said $H_2S$ is produced by a steam reformer or a process comprising burning a hydrocarbon-containing fuel with a stoichiometric deficiency of oxygen, contacting the resultant gaseous mixture with recovered liquid sulfur, thus reducing a portion of the sulfur, and catalytically hydrogenating the sulfur and sulfur compounds to $H_2S$.

9. A process according to claim 8, wherein the catalytic hydrogenation is conducted at $150°$ C.-$560°$ C.

10. A process according to claim 8 further comprising cooling said resultant gaseous mixture before contacting the latter with the liquid sulfur, and cooling resultant reaction gas prior to the catalytic hydrogenation step.

11. A process according to claim 10, wherein the catalytic hydrogenation is conducted at $150°$ C.-$560°$ C.

12. A process according to claim 1 further comprising adding to the solvent an additive accelerating the reaction rate of the reduction and/or enhancing the sedimentation of the thus-formed sulfur.

13. A process according to claim 8 further comprising separating the thus-formed sulfur from the liquid phase by passing said phases through a solid-liquid separation zone.

14. A process according to claim 13, further comprising withdrawing a concentrated mixture of solid sulfur and liquid phase during the solid-liquid separation, heating the mixture to form two liquid phases, and discharging sulfur as one liquid phase and solvent low in sulfur as the other liquid phase.

15. A process according to claim 14, wherein the mixture is heated to a temperature of about the sulfur melting point.

16. A process according to claim 14, wherein the heating of the mixture is conducted in heat exchange with heat obtained from the combustion of the hydrocarbon-containing fuel or steam reformer waste heat.

17. A process according to claim 15, wherein the heating of the mixture is conducted in heat exchange with heat obtained from the combustion of the hydrocarbon-containing fuel or steam reformer waste heat.

18. A process according to claim 1 further comprising withdrawing a concentrated mixture of solid sulfur and liquid phase during the separating step, heating the mixture to form two liquid phases, and discharging sulfur as one liquid phase, and wherein the reducing agent is $H_2S$ produced by a process comprising burning a hydrocarbon containing fuel with a stoichiometric deficiency of oxygen or steam reformer product gas, contacting the resultant gaseous mixture with said liquid sulfur, thus reducing a portion of the sulfur, and catalytically hydrogenating the sulfur and sulfur compounds to $H_2S$.

19. A process according to claim 1, wherein about 5-20% of the entire solvent stream is regenerated.

20. A process according to claim 1, wherein the physical solvent is regenerated by heating and/or by stripping.

21. A process according to claim 8, wherein the resulting gaseous mixture containing $H_2S$ which is utilized for providing reducing gas for sulfur manufacture is supplied from an $H_2$ stream from steam reformers, $H_2$ or $H_2S$ from bottles, $H_2$ from ammonia dissociation, a portion of $H_2S$-containing gas from a Claus plant, or $H_2S$ production from sulfur dioxide instead of elemental sulfur.

22. A process according to claim 1, wherein the physical solvent is polyethylene glycol dimethyl ether.

23. A process according to claim 8, wherein the heat generated from the formation of said $H_2S$ is utilized to heat the regenerating column.

24. A process according to claim 7, wherein the $H_2S$ is dissolved in the solvent present in a dissolving tank and the $H_2S$-loaded solvent is passed to the sulfur-forming reactor vessel.

* * * * *